United States Patent Office 3,055,173
Patented Sept. 25, 1962

3,055,173
NOVEL PROPELLANTS
Norman B. Godfrey, Austin, Tex., assignor to Jefferson Chemical Company, Inc., Houston, Tex., a corporation of Delaware
No Drawing. Filed Aug. 11, 1959, Ser. No. 832,903
10 Claims. (Cl. 60—35.4)

This invention relates to novel propellants for thrust reactors. More particularly, it is directed towards a hypergolic fuel, hypergolic compositions thereof and methods of utilizing said fuel and compositions in thrust reactors such as rocket engines.

An object of this invention is to provide new rocket propellants. Another object is to provide novel hypergolic fuels. Still another object is to provide methods for producing thrust in thrust reactors.

In accordance with the above objects, I have discovered that 1,4-dimethylpiperazine of the structural formula

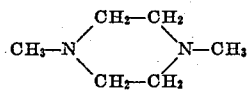

is an excellent hypergolic fuel for rocket engines. In addition, I have found that the addition of 1,4-dimethylpiperazine to conventional fuels such as kerosene and gasoline results in hypergolic fuel compositions also suitable for use in rocket engines. By the terms "hypergolic fuel" and "hypergolic fuel composition" I intend substances which spontaneously ignite upon contact with an oxidizer.

A rocket propulsion device is defined herein as a rigid container for matter and energy so arranged that a portion of the matter can absorb energy in kinetic form and subsequently be ejected in a specified direction.

One type of rocket propulsion device to which my invention is directed is the "pure" rocket, i.e., a thrust producer, which does not make use of the surrounding atmosphere. The pure rocket is propelled by introduction of a propellant material into the combustion chamber located therein and burning it under conditions that will cause the propellant to release energy at a high rate immediately after entry into the combustion chamber. The liquid rocket propellant is normally carried in a vessel or vessels situated within the rocket and pumped into the combustion chamber. The combustion chamber must be constructed to withstand high pressure and temperature and need only be large enough to insure combustion. The flow of liquid propellant into the combustion chamber is normally regulated at will so that continuous or intermittent thrust or bursts of power can be sustained. The intermittent propellant flow promotes an extended life for the combustion chamber and thrust nozzle.

In the past numerous liquid compounds have been found useful as pure rocket propellants. Those propellants consisting of a single compound or element are termed as "monopropellants." Those rocket propellants involving two materials are classified as "bipropellants" and generally consist of an oxidizer (oxidant) and hypergolic fuel. Hydrogen peroxide and nitromethane are well known monopropellants. Well known bipropellants include hydrogen peroxide or liquid oxygen as the oxidant and a hypergolic fuel component such as ethyl alcohol-water, ammonia, hydrazine or hydrogen. Other bipropellant combinations are nitric acid as the oxidizer with aniline or furfuryl alcohol as the hypergolic fuel component. In the operation of a thrust reactor utilizing a bipropellant, the hypergolic fuel component and oxidizer component are stored in separate vessels in the reactor. When combustion is desired, these two components are fed separately and simultaneously into the combustion chamber of the reactor where contact between the two components takes place. This contact results in spontaneous combustion.

In accordance with the objects of the invention, I have discovered 1,4-dimethylpiperazine to be an excellent hypergolic fuel for bipropellants utilized in pure rockets. In addition, I have discovered compositions comprising between about 70 and 99% by volume of 1,4-dimethylpiperazine and between about 1 and 30% by volume of a liquid hydrocarbon having a boiling point less than about 800° F. are also excellent hypergolic fuels for rocket engines. Specific examples of the liquid hydrocarbons contemplated herein are n-heptane, gasoline, a kerosene (JP-4), isooctane, diisobutylene, cyclohexane, methyl cyclohexane, benzene, toluene and the like.

The oxidizers most suitable for use with 1,4-dimethylpiperazine and 1,4-dimethylpiperazine-liquid hydrocarbon are white fuming nitric acid (90–100 wt. percent $HNO_3$) and red fuming nitric acid. The latter acid is white fuming nitric acid having dissolved therein 6–14 wt. percent nitrogen dioxide to make the ignition more prompt when brought into contact with the hypergolic fuel. Other suitable oxidizers for the hypergolic fuels of my invention which can be used in the bipropellants of the invention are hydrogen peroxide, ozone, nitrogen tetraoxide, oxygen and anhydrous mixtures of nitric and sulfuric acids such as 80–90% by volume white or red fuming nitric acid and 10–20% by volume anhydrous or fuming sulfuric acid. It is also within the scope of this invention to employ ignition or oxidation catalysts which are preferably dissolved in the oxidizer. These catalysts include metal salts such as the chlorides and naphthenates of iron, cobalt and zinc.

The ratio of oxidizer to hypergolic fuel in the bipropellants contemplated herein based on stoichiometric amounts can desirably be utilized within the limits of about 0.5:1 to 1.5:1, the efficiency of combustion being less at ratios below 1:1 and the use of oxidizer being less economical at ratios above 1:1. However, a stoichiometric ratio of oxidizer to fuel as high as 6:1 is operable.

The following examples further illustrate my invention:

*Example I*

This example describes one method of preparing 1,4-dimethylpiperazine and the properties of the resultant product.

An enclosed kettle was charged with 85 lbs. of water, 37.5 lbs. of sodium hydroxide and 36.5 lbs. of piperazine. The mixture was heated to 80° C. and 43 lbs. of methyl chloride was added slowly at a kettle pressure not exceeding 50 p.s.i.g. After the addition of the methyl chloride the kettle temperature was maintained at 80° C. for 2 hours to allow for completion of the reaction. The reaction mixture was then cooled and filtered. The filtrate was distilled to obtain 1,4-dimethylpiperazine as a water azeotrope in 40% yield based on the piperazine reactant. The water azeotrope formed two layers, an upper crude 1,4-dimethylpiperazine layer and a lower aqueous layer. The azeotrope was saturated with sodium hydroxide and the upper layer of the azeotrope was separated from the lower layer. The upper layer was fractionally distilled and a distillate fraction consisting of 1,4-dimethylpiperazine was collected at about 131–133° C. The recovered 1,4-dimethylpiperazine product was a colorless, mobile liquid having a specific gravity (20/4° C.) of 0.8565, a refractive index of ($n_D^{20}$) of 1.4475 and a flash point of 85° F.

*Example II*

This example establishes 1,4-dimethylpiperazine as a hypergolic fuel.

At an ambient temperature of 72° F. one part by volume of 1,4-dimethylpiperazine is dropped into a vessel containing four parts by volume of white fuming nitric acid (90 wt. percent $HNO_3$). Immediately upon contact of the dimethylpiperazine and acid, there is a mild explosion and burst of flame.

*Example III*

This example illustrates the hypergolicity of a mixture of 1,4-dimethylpiperazine and a non-hypergolic liquid hydrocarbon.

At an ambient temperature of 72° F. one part by volume of a liquid mixture consisting of 80% by volume 1,4-dimethylpiperazine and 20% by volume cyclohexane is added to four parts by volume white fuming nitric acid (90 wt. percent $HNO_3$) contained in a vessel. Immediately upon contact of the fuel mixture with the acid an explosive burning takes place.

Obviously, many modifications and variations of the invention as hereinbefore set forth may be made without departing from the spirit and scope thereof and therefore only such limitations should be imposed as are indicated in the appended claims.

I claim:

1. A hypergolic fuel consisting essentially of between about 70–99% by volume of 1,4-dimethylpiperazine and between about 1 and 30% by volume of a liquid hydrocarbon having a boiling point less than about 800° F.

2. A fuel in accordance with claim 1 wherein said liquid hydrocarbon is cyclohexane.

3. A method of developing a thrust in a reactor comprising passing a stream of fuel into the combustion chamber of said thrust reactor and igniting said fuel therein, said fuel consisting essentially of 1,4-dimethylpiperazine.

4. A method of developing a thrust in a reactor comprising passing a stream of fuel into the combustion chamber of said thrust reactor and igniting said fuel therein, said fuel consisting essentially of between about 1 and 30% by volume of a liquid hydrocarbon having a boiling point less than about 800° F. and between about 70 and 99% by volume of 1,4-dimethylpiperazine.

5. A method of developing thrust in a thrust reactor comprising separately and simultaneously passing a stream of oxidizer and fuel into contact with one another in the combustion chamber of said reactor in such proportions as to produce spontaneous ignition, said fuel component consisting essentially of 1,4-dimethylpiperazine.

6. A method of developing thrust in a thrust reactor comprising separately and simultaneously passing a stream of oxidizer and fuel into contact with one another in the combustion chamber of said reactor in such proportions as to produce spontaneous ignition, said fuel component consisting essentially of between about 70 and 99% by volume of 1,4-dimethylpiperazine and between about 1 and 30% by volume of a liquid hydrocarbon having a boiling point less than 800° F.

7. A method of developing thrust in a thrust reactor comprising separately and simultaneously injecting a stream of oxidizer and fuel into the combustion chamber of said reactor in stoichiometric ratio of oxidizer to fuel from about 0.5:1 to 1.5:1, said oxidizer consisting essentially of fuming nitric acid and said fuel consisting essentially of 1,4-dimethylpiperazine.

8. A method of developing thrust in a thrust reactor comprising separately and simultaneously injecting a stream of oxidizer and fuel into the combustion chamber of said reactor in stoichiometric ratio of oxidizer to fuel from about 0.5:1 to 1.5:1, said oxidizer consisting essentially of fuming nitric acid and said fuel consisting essentially of between about 70 and 99% by volume of 1,4-dimethylpiperazine and between about 1 and 30% by volume of a liquid hydrocarbon having a boiling point less than 800° F.

9. A thrust reactor fuel consisting essentially of 1,4-dimethylpiperazine and a liquid hydrocarbon having a boiling point less than about 800° F. in such proportions as to produce spontaneous ignition upon contact with an oxidizer.

10. A method of developing thrust in a reactor which comprises reacting a fuel consisting essentially of 1,4-dimethylpiperazine with an oxidizer in the combustion chamber of said thrust reactor and discharging resulting reaction products therefrom.

No references cited.